United States Patent [19]

Bond

[11] 3,995,716
[45] Dec. 7, 1976

[54] KNOCKDOWN SAW HORSE WITH CLAMP TYPE LEGS

[76] Inventor: Robert M. Bond, 973 Shadybrook Drive, Akron, Ohio 44312

[22] Filed: Aug. 27, 1975

[21] Appl. No.: 608,186

[52] U.S. Cl. .............................. 182/186; 182/226
[51] Int. Cl.² ........................................ F16M 11/00
[58] Field of Search .......... 182/186, 181, 182, 183, 182/184, 226, 224, 151, 153

[56] References Cited
UNITED STATES PATENTS

| | | | |
|---|---|---|---|
| 129,978 | 7/1872 | Noggle | 182/183 |
| 467,081 | 1/1892 | Church | 182/151 |
| 1,298,867 | 4/1919 | Beland | 182/183 |
| 2,373,485 | 4/1945 | Long | 182/151 |
| 3,379,282 | 4/1968 | Knuth | 182/151 |

*Primary Examiner*—Reinaldo P. Machado
*Attorney, Agent, or Firm*—Oldham & Oldham Co.

[57] ABSTRACT

A pair of support leg means each comprising a pair of identical support members are secured together by individual bolts to engage a dependent web of the top member of the saw horse. Each support member has a tapered flat abutting surface thereon and an adjacent tapered flat clamping surface formed on offset inner lateral marginal portions thereof which are at the upper end portions of the support members when operatively positioned. The abutting surfaces are at a first acute angle to the longitudinal axis of the support member and the clamping surfaces are at an acute angle several degrees less than the abutting surfaces to facilitate obtaining a good clamping action by the support members onto the web members when the pairs of support leg means are operatively positioned.

9 Claims, 6 Drawing Figures

KNOCKDOWN SAW HORSE WITH CLAMP TYPE LEGS

BACKGROUND OF INVENTION

Heretofore there have been many different types of saw horses provided and they are in widespread commercial use at this time. Primarily, such saw horses are made as fixed, assembled units and they are not readily movable from one location to another. Efforts have been made heretofore to provide a knock-down saw horse in which the components thereof can be assembled at the point of use. However, all of such prior saw horses as known to me have either been relatively heavy, have not provided a good satisfactory support action, have been relatively difficult to assemble, or hve not been completely satisfactory for one or more other reasons.

The general object of the present invention is to provide a sturdy, relatively inexpensive type of a saw horse that has improved stability and strength when in use.

Another object of the invention is to provide a saw horse having a pair of support leg means provided therefor and wherein each support leg means comprises a pair of identical support members, each having flat abutting surfaces and a flat clamping surface formed on adjacent but offset surfaces thereof and adapted to be at the upper end portions of the support leg means when operatively positioned so as to be secured to and clamp against a dependent web member forming a portion of the top of the saw horse.

Another object of the invention is to provide an effective saw horse construction that is adapted to be shipped or stored in "known-down" form as a compact unit and be readily assembled into a sturdy, operative saw horse.

Other objects of the invention are to provide a relatively inexpensive saw horse, the components of which can be cut to suitable sizes in large quantities prior to assembly of the saw horse and to provide for assembly of the saw horse at the point of use therefor; to provide a saw horse wherein the upper ends of the saw horse support legs are mechanically engaged with recesses formed in the lower surface of the top member of the saw horse; and, to retain all components of the saw horse in unitary association with each other both in inoperative and operative conditions for the saw horse.

The foregoing and other objects and advantages of the invention will be made more apparent as the specification proceeds.

Reference now is made to the accompanying drawings, wherein FIG. 1 is a vertical sectional view, fragmentary, through the upper end of the saw horse as operatively positioned;

With reference to corresponding members shown in the drawings and referred to in the specification, corresponding numerals are used to facilitate comparison therebetween.

SUBJECT MATTER OF THE INVENTION

Figure 1:
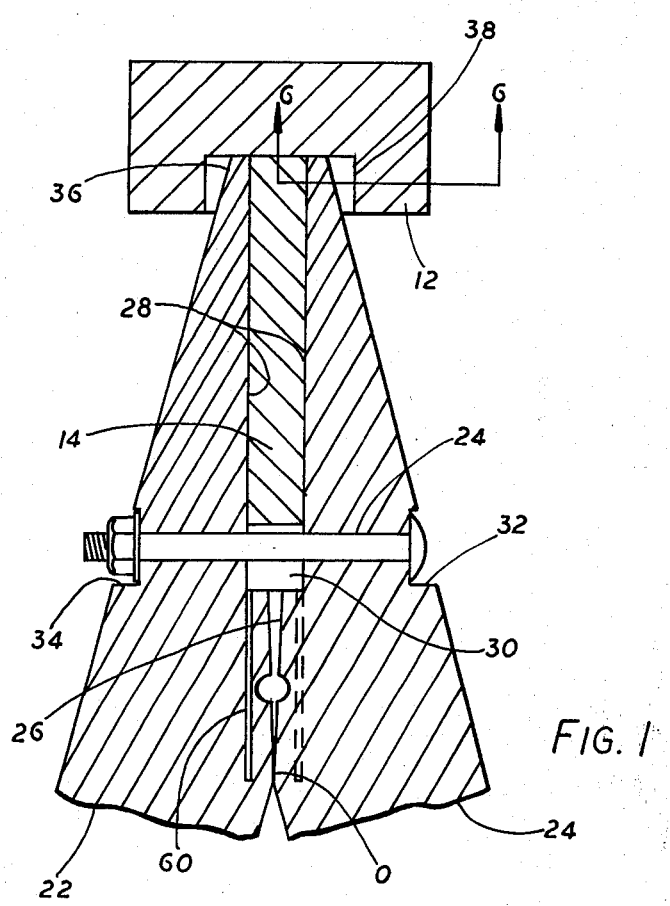

The saw horse of the invention, as one embodiment thereof, comprises a top member, a dependent web member secured to the top member and depending therefrom, a pair of support leg means, and a pair of bolt means, one of which engages each of the pair of said support leg means to secure individual members thereof together, and characterized by each of the support leg means comprising a pair of identical support members, each having a flat abutting surface and a flat clamping surface formed on adjacent but offset inner edge portions thereof, and with such surfaces being at the upper end portions of the support leg means when operatively positioned, the abutting surfaces being at a first acute angle to the longitudinal axis of the support member and the clamping surfaces being at an acute angle differing several degrees from the first angle whereby the individual support leg means can have the support members thereof clamped together and to the web member by a bolt means to force at least a portion of the abutting surfaces in contact and to draw up the clamping surfaces against the web member using a portion of the abutting surfaces as the fulcrum means.

Reference now is made to the details of this structure shown in the accompanying drawings and a saw horse is indicated as a whole by the numeral 10. This saw horse comprises a top member or board 12 and a dependent member 14. Usually the dependent member is a board or a structure such as about 1 inch × 5 inches, and it is received in a slot 16 formed in the lower surface of such a top member 12. The dependent member 14 usually is permanently secured to the top member 12 as by inclined dowels 18 or the like, and which dowels may extend to the upper surface of the top member 12 and be formed from wood so that no interference with any sawing action on the saw horse would ever occur from these dowel members.

The saw horse is supported by a pair of support leg means 20. Each of such support leg means, in turn, comprises a pair of identical support members 22, 22. The support members 22 are operably secured together, usually by a bolt means 24.

Figure 2:
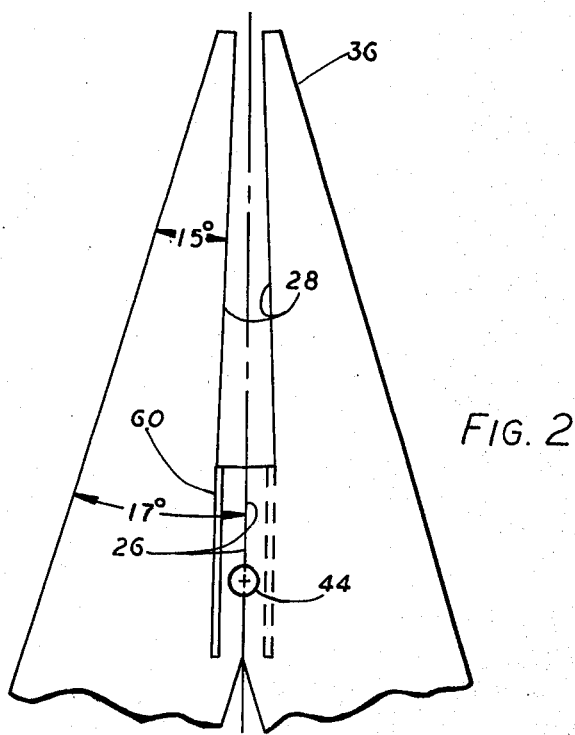
FIG. 2 is an elevation of a pair of support members provided to engage one end of the saw horse and support the same.
Figure 3:
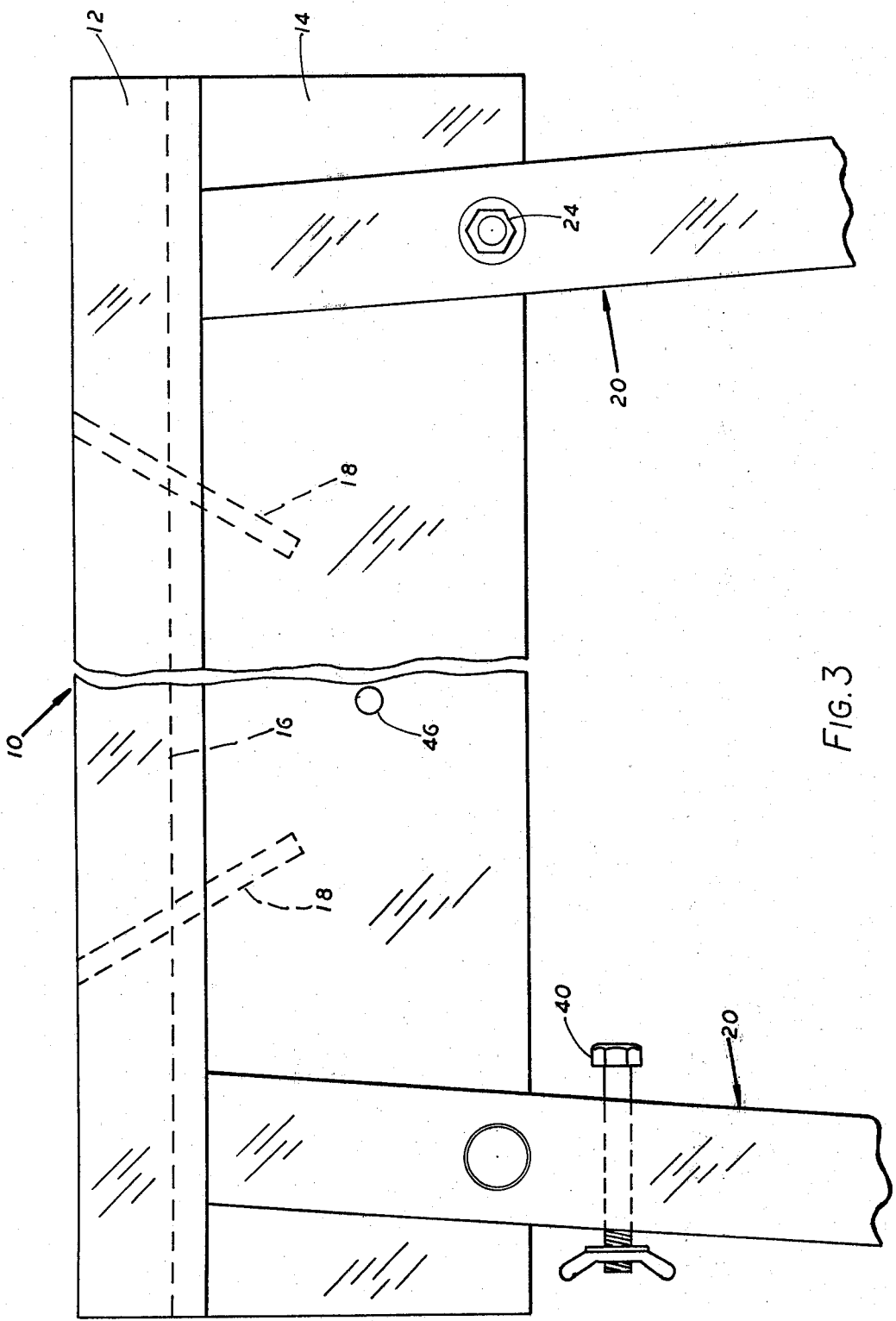
FIG. 3 is a side elevation of the saw horse as operatively positioned.

It is a feature of the invention, that the identical support members 22 each have a flat abutting surface 26 formed thereon and also a flat clamping surface 28. These surfaces 26 and 28 are offset from each other and they are on the inner surfaces of the support members 22 as operatively positioned and with the surfaces being at or adjacent upper end portions of the support leg members. Specifically, the abutting surface 26 is below and shorter than the clamping surface 28, as shown in FIGS. 1 and 2 of the drawings. The clamping surfaces 28 are each offset from the adjacen of the abutting surface 26 about ½ the thickness of the dependent member 14. FIG. 2 shows how the pair of support members 22, 22 associate with each other when the abutting surfaces 26 are placed in full aligned contact. However, when the abutting surfaces are just brought against each other to form a lever means, as indicated in FIG. 1 and wherein the lever means formed from the pair of leg members would have a fulcrum point at 0, then the clamping surfaces 28, as operative in FIG. 1, are moved to be substantially parallel to each other. The bolt means 24 usually is received in slots 30 formed in the lower edge of the dependent member 14, whereby this bolt means is in good operative engagement with the upper end portions of the support members in the clamping surface areas, and can effectively be tightened to draw the clamping surfaces 28 into good clamping engagement with the dependent member 14 for substantially the entire vertical height thereof.

Normally, the abutting surfaces and clamping surfaces both are formed at acute angles to the longitudinal axis of the individual support members 22, and normally the abutting surfaces 26 are tapered a few more degrees such as from about 1° to about 3 or 4° more than the clamping surfaces 28. For example, if the clamping surfaces 28 are at an acute angle to the longitudinal axis of the support member of about 15°, then the abutting surfaces 26 would form an angle of from about 16° to 20° with the axis, preferably, about 17°.

The outer marginal portions of the support members 22 can be recessed as at 32 and 34 to receive the head or nut of the bolt to provide a more attractive saw horse design, and with the bolt usually being seated to be locked against rotation in the support leg members.

Figure 4:
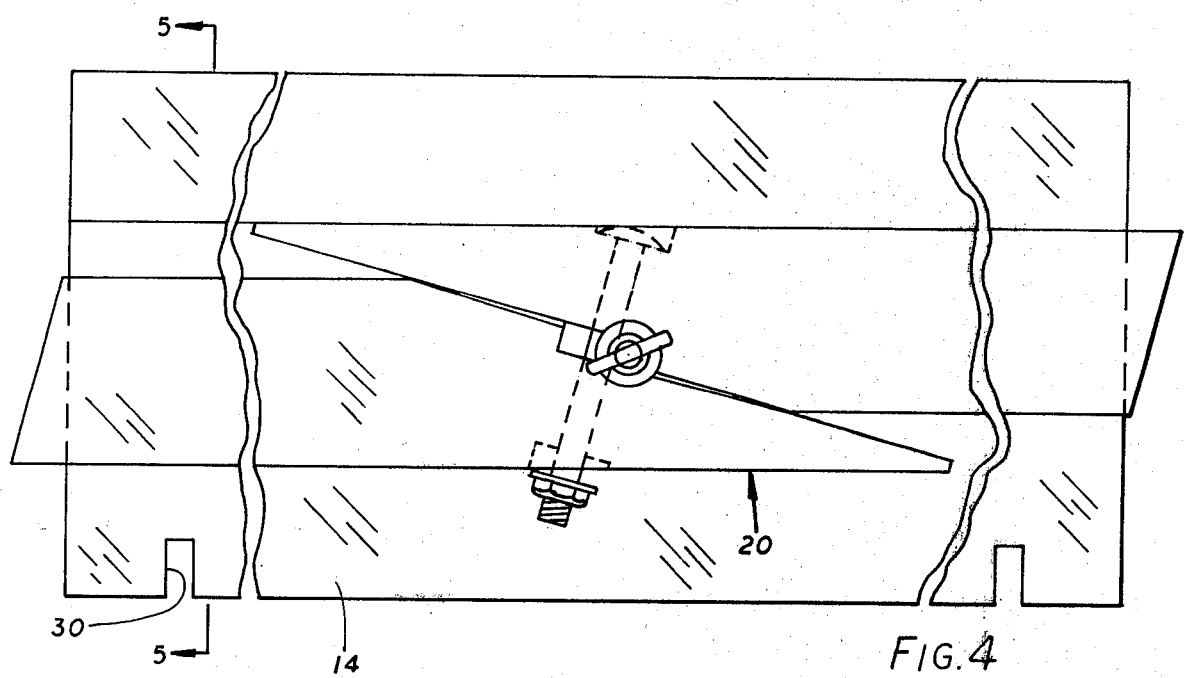
FIG. 4 is a fragmentary plan of the saw horse in compact "knock-down" form.
Figure 5:
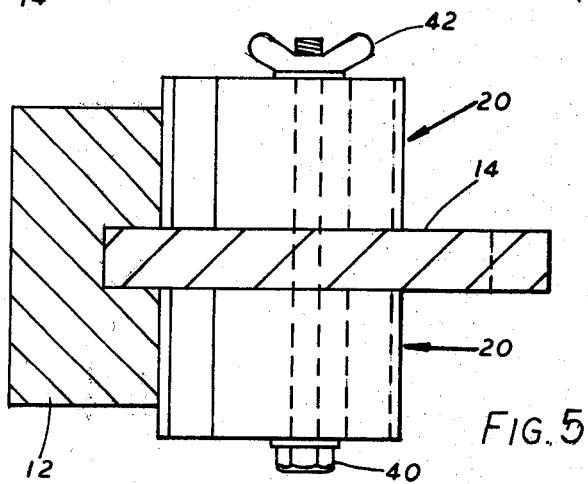
FIG. 5 is a section taken on line 5—5 of FIG. 4.
Figure 6:
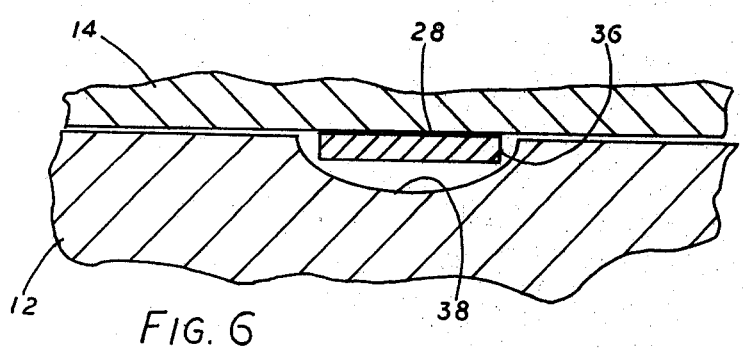
FIG. 6 is a fragmentary horizontal section on line 6—6 of FIG. 1.

Another feature of the invention is that it can be readily shipped in or assembled in knock-down form as indicated in FIGS. 4 and 5. Thus, the dependent or web member 14 is adapted to have one of the support leg means 20 positioned on each face or surface of such web member, as shown in FIG. 5. Then the support leg means are secured to the web member 14, as by bolt 40. Such bolt 40 has a wing nut 42 provided therefor and suitable washer means as needed can be associated with the bolt 40 to aid in retaining it in position with the compacted saw horse. Normally, this bolt, when not in use, can be stored in a hole 44 formed in the abutting surfaces 26 of the pair of support members, as shown in FIG. 2. Even when the abutting surfaces are separated slightly, as shown in FIG. 1, still this bolt 40 can be retained therein when the saw horse is operatively positioned. When the saw horse is operatively positioned, the bolt or the wing nut 42 thereon can be engaged with an adjacent margin of the web member 14, if desired, to aid in retaining the nut in position. Obviously, the spacing of the hole 44 from the web 14 can be varied as desired so that it will be immediately adjacent the lower end of the member 14 to retain the bolt or nut 42 in a given position. This bolt 40 extends through an oblong slot 46 formed in the web member when the saw horse is bolted together in knock-down form. At such time, normally the two support members of one support leg means 20 are rotated 180° with relation to each other and are rotated around the bolt means 24 to take the position shown in FIG. 4. Then the bolt 40 can be threaded through the hole 46 and the openings formed between the offset abutting surfaces 26 of the individual support members.

When setting up the saw horse for action, it has been found that the two support members 22 of one support leg means will adjust to the support terrain should there be some horizontal misalignment of the support surfaces for these paired support members. Such action is obtained by having some looseness between the bolt 24 and the holes in the support members 22 in which the bolt is received.

FIGS. 1 and 5 of the drawings show yet another feature of the present invention. That is, the clamping surfaces 28 form blunt points 36 at the upper ends of the support members as operatively positioned, and such blunt points 36 are received in annular recesses 38 formed in the under surface of the top member 12 on the center line thereof at the longitudinally spaced portion thereof that is to have a support leg means engaged therewith. These annular recesses 38 extend into the surface of the top member about, for example, one-half inch and are sized so as to receive and hold the blunt ends or points 36 of the support members therein against extensive lateral movement or looseness. Some clearance may be provided for each point 36 in the semi-circular portion of the recess in which it is received to permit the members 22 to make some position adjustment for an irregular support surface.

For different sizes of dependent members 14, and/or for different angular relationships of the support leg means to the vertical, the particular angular relations of the surfaces 26 and 28 to the longitudinal axis of the support members will vary but the abutting surfaces 26 must still be at slightly greater angles than the clamping surfaces 28.

From the foregoing, it will be seen that an improved saw horse has been provided and that such saw horse can be made from wood or it can be made from other suitable materials as desired. The saw horse will be sturdy when set up and will provide very satisfactory support action for work performed thereon.

The legs 22 and 24 normally are made of wood and the clamping surfaces 28 are cut in the legs from the upper ends thereof, usually by a disc saw. In all events, end kerfs 60 are formed in each leg of the horse at the end of the clamping surface 28 as indicated in FIGS. 1 and 2. The kerfs 60 obviously do not extend all the way through the legs and progressively decrease in depth. It has been found that such kerfs are helpful in that they provide some flexibility in the clamping surfaces 26 and the engagement therebetween. The kerfs 60 extend substantially diagonally of the clamping surfaces 26.

While one complete embodiment of the invention has been disclosed herein, it will be appreciated that modification of this particular embodiment of the invention may be resorted to without departing from the scope of the invention.

What is claimed is:

1. A saw horse comprising a top member, a dependent web member, a pair of support leg means and a pair of securing bolt means, one engaging each one of said support leg means, and characterized by each of said support leg means comprising a pair of identical support members, each having a flat surface and a flat clamping surface formed on adjacent but offset inner surfaces thereof, said surfaces being at the upper end portions of said support leg means when operatively positioned and with said abutting surface being spaced from the ends of said support members and said clamping surfaces extending to the ends of such members, said abutting surfaces being at a first acute angle to the longitudinal axis of said support member and said clamping surfaces being at an acute angle differing several degrees from and being smaller than said first acute angle whereby said support leg means can be clamped together and to said web member by said bolt means with at least a portion of said abutting surfaces initially being in contact to draw said clamping surfaces against said web member as said bolt means is tightened.

2. A saw horse as in claim 1, where said clamping surfaces are offset from said abutting surfaces about one half the thickness of said web member.

3. A saw horse as in claim 1, where one end of each of said support members is tapered to form a blunt point, and said top member has a pair of annular recesses in longitudinally spaced portions of its lower surface having arcuate sections and protruding from said web member on opposite sides thereof, said blunt points of said pairs of said support members are individually received in said arcuate sections of said recesses, when said support members are operatively positioned in engagement with opposed portions of said web member.

4. A saw horse as in claim 3 where said blunt points are each received in substantially semi-circular portions of a said recess and have some lateral clearance therein.

5. A saw horse as in claim 1, where said clamping surfaces are tapered at from about 1 to 4° less than said abutting surfaces.

6. A saw horse as in claim 1, where said legs are made of wood, said legs have kerfs therein at the ends of said clamping surfaces and forming a continuation thereof extending into said legs under portions of said abutting surfaces.

7. A saw horse as in claim 1, where said web member has a pair of upwardly extending kerfs formed in spaced portions of its lower edge, and said bolt means extend through said kerfs when said support leg means are operatively positioned and said kerfs limit lateral movement of said bolt means.

8. A saw horse as in claim 7 where the upper end of each of said support members is tapered to form a blunt point, and said top member has a pair of annular recesses in longitudinally spaced portions of its lower surface and which have arcuate sections protruding from said web member on opposite sides thereof, said blunt points of said pairs of said support members are individually loosely received in said arcuate sections of said recesses, when said support members are operatively positioned in engagement with opposed portions of said web member whereby relative lateral movement of the upper ends of said support members is possible to adjust said support members to an uneven support surface.

9. A saw horse as in claim 1, where said web member is secured to said top member, and when the saw horse is knocked down for storage, a support leg means is positioned in inoperative form on each surface of said web member with each of said securing bolt means loosely engaging its pair of support members, said support members each having a pointed upper end when operatively positioned, said pointed ends extending in opposite directions in the knocked down saw horse.

* * * * *

UNITED STATES PATENT OFFICE
CERTIFICATE OF CORRECTION

Patent No. 3,995,716             Dated December 7, 1976

Inventor(s) Robert M. Bond

It is certified that error appears in the above-identified patent and that said Letters Patent are hereby corrected as shown below:

Column 1, line 16, "hve" should be -- have --

Column 1, line 34, "known-down" should be -- knock-down --

Signed and Sealed this

Fifteenth Day of March 1977

[SEAL]

Attest:

RUTH C. MASON
*Attesting Officer*

C. MARSHALL DANN
*Commissioner of Patents and Trademarks*